United States Patent [19]

Numakura et al.

[11] 3,730,983

[45] May 1, 1973

[54] RECORDING AND REPORDUCING SYSTEM FOR COLOR VIDEO SIGNAL

[75] Inventors: Toshihiko Numakura, Tokyo; Morio Yoshimatsu, Kanagawa-ken, both of Japan

[73] Assignee: Sony Corporation, Tokyo, Japan

[22] Filed: May 15, 1970

[21] Appl. No.: 37,696

[30] Foreign Application Priority Data

Jan. 26, 1970 Japan....................................45/6856

[52] U.S. Cl.............................178/5.4 CD, 178/6.6 A

[51] Int. Cl...............................H04n 9/38, H04n 5/78

[58] Field of Search........................178/5.4 CD, 6.6 A

[56] References Cited

UNITED STATES PATENTS 3,507,983 4/1970 Leman..............................178/6.6 A
2,960,563 11/1960 Anderson........................178/5.4 CD
3,580,990 5/1971 Numakura......................178/5.4 CD

FOREIGN PATENTS OR APPLICATIONS 1,580,119 7/1969 France...........................178/5.4 CD
1,188,392 4/1970 Great Britain..................178/5.4 CD

*Primary Examiner*—Robert L. Griffin
*Assistant Examiner*—George G. Stellar
*Attorney*—Lewis H. Eslinger, Alvin Sinderbrand and Curtis, Morris & Safford

[57] ABSTRACT

A composite color video signal may be magnetically recorded by separating the luminance and chrominance signals, and frequency modulating the former on a carrier, and frequency shifting the latter such that the bands of the frequency-modulated luminance signal and the frequency-converted chrominance signal are substantially not overlapping. The two signals are then combined and magnetically recorded with the frequency-converted chrominance signal added to the frequency-modulated luminance signal. To avoid a beat interference between the second harmonic of the carrier of the frequency-converted chrominance signal and the luminance signal, the system is designed to interleave the second harmonic of the carrier of the frequency-converted chrominance signal with the luminance signal. By avoiding the beat interference the amplitude of the frequency-converted chrominance signal relative to the amplitude of the frequency-modulated luminance signal can be made large with resulting good signal-to-noise ratio of the chrominance signal.

4 Claims, 4 Drawing Figures

INVENTOR
TOSHIHIKO NUMAKURA
MORIO YOSHIMATSU
BY
ATTORNEY

INVENTOR
TOSHIHIKO NUMAKURA
MORIO YOSHIMATSU
BY [signature]
ATTORNEY

RECORDING AND REPORDUCING SYSTEM FOR COLOR VIDEO SIGNAL

The invention relates generally to a system for recording and reproducing a video signal and, particularly, it is directed to improvements in the recording and reproducing of a color video signal.

The color video signals for transmission in the United States have been standardized by the (NTSC) as composite color signals consisting of a luminance signal, and a modulated chrominance signal comprised of subcarriers having a standard frequency of about 3.58 MHz. In fact this frequency is 3.579545 MHz. It has been simplified herein at 3.58 MHz. In such composite color signals, the frequency band of the chrominance signal is within that of the luminance signal.

A system heretofore proposed for recording and reproducing this composite signal involved separation of the luminance signal and the chrominance signal from the composite color video signal. The separated luminance signal was used to frequency-modulate a carrier, and the separated chrominance signal of the composite signal had its frequency band shifted below the frequency band of the frequency-modulated luminance signal. Because the amplitude of the chrominance signal would have to be small, a small band width pilot signal was also prepared to help reconstitute the chrominance signal. The carrier frequency-modulated by the luminance signal was combined with the frequency shifted or converted chrominance signal and with the pilot signal, which had a frequency band below the frequency band of the latter, to constitute a combined signal which was then magnetically recorded. When the recorded combined signal was magnetically reproduced, the carrier frequency-modulated by the luminance signal, the frequency-converted chrominance signal and pilot signal were extracted. Whereupon, the extracted luminance signal was demodulated, the pilot signal separated, and the frequency-converted chrominance signal —its amplitude controlled on the basis of the detected variations in the amplitude of the separated pilot signal — had its frequency band returned to substantially its original limits controlled at least partly on the basis of the pilot signal. The reconstituted chrominance signal was then combined with the demodulated luminance signal to substantially reconstitute the composite color video signal. Such a system is shown and described in U.S. Pat. No. 3,580,990, assigned to the same assignee as the present application.

In magnetically recording the combined signal, the frequency-modulated luminance signal is utilized as not only a recording signal itself, but also as a bias signal for the recording of the frequency-converted chrominance signal. The band of frequencies of the frequency-converted chrominance signal is less than the band of frequencies of the frequency-modulated signal.

A direct consequence of this mode of recording is that the amplitude of the frequency-converted chrominance signal is selected to be relatively small compared with that of the amplitude of the frequency-modulated luminance signal. For example, the level difference was such that the level ratio was approximately one-tenth to one-twentieth, or that the level of the frequency-converted chrominance signal was from about 5 to 10 percent of the level of the frequency-modulated luminance signal.

This low level of the recorded frequency-converted chrominance signal is disadvantageous in that, when the frequency-converted chrominance signal is reconverted to substantially its original frequency band, the reproduced chrominance signal is in a poor signal-to-noise condition. This to a major extent is the result of the low level of the frequency-converted chrominance signal. If the level of the frequency-converted chrominance signal is increased in order to improve the signal-to-noise ratio, a beat interference is caused which appears in any reproduced picture. The beat interference was thought to be due to the frequency-converted chrominance signal being included in the reproduced luminance signal.

According to our research, it was discovered that the interference beat was caused mostly by the second harmonic of the carrier frequency of the frequency-converted chrominance signal. The second harmonic, as well as basic carrier and other harmonics, appeared in the reconstructed luminance signal but the second harmonic signal had a relatively larger amplitude than the signals corresponding to the carrier frequency and its other harmonics. In reproducing a picture the second harmonic because of its level caused deterioration of the reproduced picture, the basic and other harmonic signals did not distort the picture and could be neglected. Accordingly, in the present invention we have devised a scheme for avoiding the distortion caused by the second harmonic of the carrier frequency of the frequency-converted chrominance signal and thereby can increase the level of the frequency-converted chrominance signal. By interleaving the second harmonic of the basic frequency of the frequency-converted chrominance signal with the luminance signal, the second harmonic is kept separated from the luminance signal and consequently the level of the frequency-converted chrominance signal can be increased with a resulting stronger reconstituted chrominance signal and signal-to-noise ratio.

Accordingly, it is an object of this invention to provide a system for recording and reproducing color video signals wherein the reproduced picture is relatively free from beat interference signals.

Another object of the invention is to provide a system for recording and reproducing color video signals wherein the reproduced chrominance signal has good signal-to-noise ratio.

Another object of this invention is to provide a simplified system for recording color video signals having a combined frequency-modulated luminance signal and frequency-converted chrominance signal.

Another object of the invention is to provide a system for recording and reproducing color video signals wherein a carrier frequency-modulated by the luminance signal and frequency-converted chrominance signals are combined with a specific frequency relation between a carrier frequency of the chrominance signal and the luminance signal.

According to the invention there is provided a system for recording and reproducing a composite color video signal consisting of a luminance signal and a modulated chrominance signal having means for extracting said luminance signal and chrominance signal from said composite signal, means for frequency-modulating a carrier by said luminance signal, means for frequency-converting the chrominance signal to a lower frequency band than that of said carrier frequency-modulated by the luminance signal, and with an interleaving relation between at least one of the harmonics of the carrier frequency of the converted chrominance signal and the luminance signal, means for combining said carrier frequency-modulated by the luminance signal with said frequency-converted chrominance signal and means for magnetically recording said combined signal. The invention may also include, in combination with the above, means for magnetically reproducing the magnetically recorded combined signal, means for extracting said carrier frequency-modulated by the luminance signal and frequency-converted chrominance signal from said reproduced signal, means for demodulating the luminance signal, means for reconverting the chrominance signal, and means for combining said demodulated luminance signal with said reconverted chrominance signal so as to substantially reconstitute the composite color video signal.

A fuller appreciation of the above, and other objects, features and advantages of the invention will appear from the following description of illustrative embodiments which is to be read in connection with the accompanying drawings, wherein.

Figure 1:
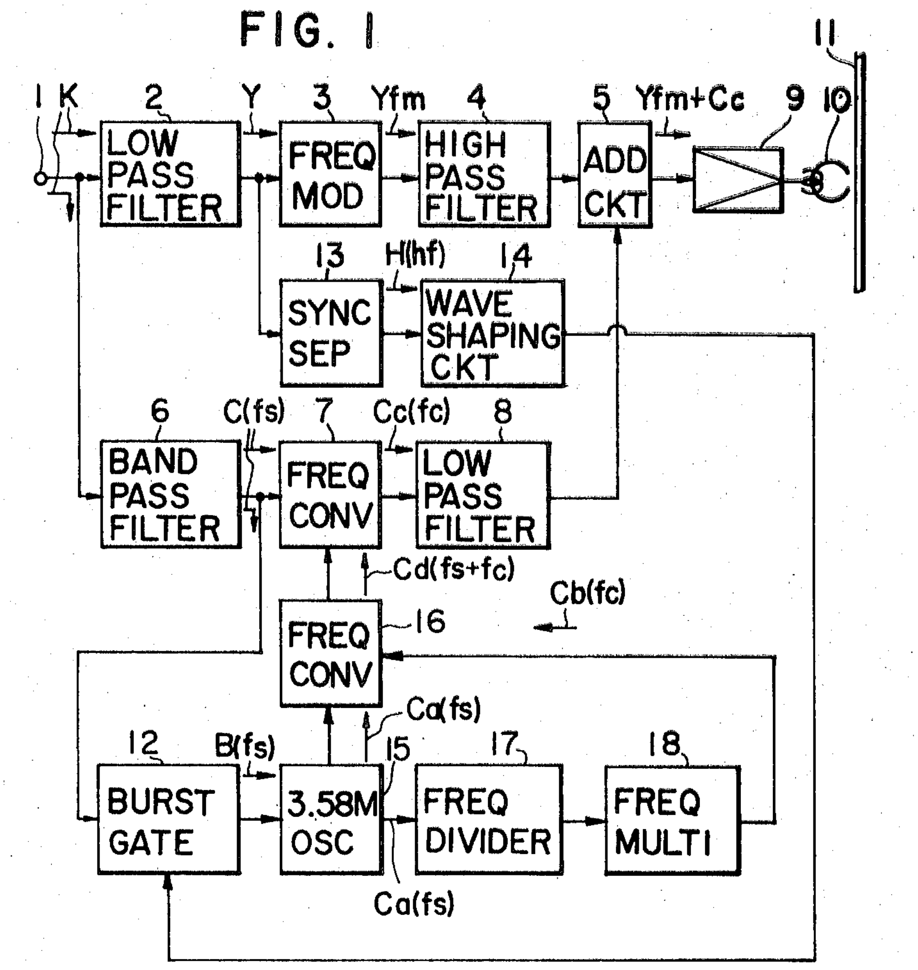
FIG. 1 is a schematic block diagram showing an embodiment of the system for magnetically recording color video signals in accordance with the invention.

Referring to FIG. 1 of the drawings, it will be seen that an input terminal 1 is provided to receive an input signal K which is to be magnetically recorded and reproduced. Although the system of the present invention is applicable to various input signals, the preferred embodiment as hereinafter described is presented as utilizing a NTSC system composite color television signal. Such composite signal consists of a luminance signal Y and a modulated chrominance signal *C(fs)* made up of color subcarriers of approximately 3.58 MHz which are modulated with I and Q and are 90° out of phase with each other.

Figure 2:
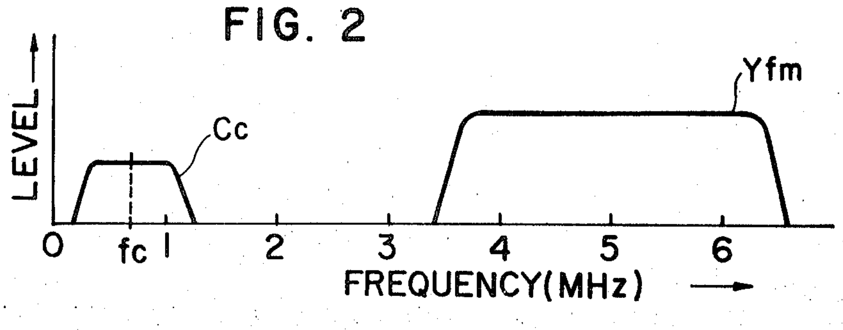
FIG. 2 is a diagram showing the frequency spectrum of the carrier frequency-modulated by the luminance signal, and the frequency shifted chrominance signal.

In the system, means are provided to frequency modulate a carrier wave with the luminance signal Y and, as shown, such means may include a low-pass filter 2 of about 3 MHz, and a frequency modulator 3 which modulates a carrier wave with the luminance signal, so that, for example, the tip level of the synchronizing signal may correspond to about 3.5 MHz and the peak level to about 6.5 MHz as shown in FIG. 2. The resulting frequency-modulated signal *Yfm* is then supplied through a high-pass filter 4 to an add circuit 5.

The modulated chrominance signal *C(fs)* is extracted converter from the composite signal K by a band pass filter 6 which has, for example, a band width of ±0.6 MHz with the center frequency *fs* of the band being at 3.58 MHz. The signal *C(fs)* is supplied to a frequency converter 7 which may be constructed in the form of a balanced modulator. Further, a part of the extracted modulated chrominance signal *C(fs)* is supplied to a burst gate or burst signal extracting circuit 12 so that a burst signal *B(fs)* of 3.58 MHz is obtained.

The burst gate is also controlled by the horizontal synchronizing signal of the luminance signal. A horizontal synchronizing signal separator 13 and wave shaping circuit 14 are connected between the output of the low-pass filter 2 and the burst gate 12 to sense the horizontal synchronization signal coming from the filter 2 and provide a gate signal to the burst gate 12. This burst signal *B(fs)* is supplied to a 3.58 MHz oscillator 15 which provides a first frequency signal *Ca(fs)* which is locked to the burst signal frequency.

A first frequency signal *Ca(fs)* from oscillator 15 is supplied to a frequency converter 16 to which is also supplied a second frequency signal *Cb(fc)*. This second frequency signal signal *Cb(fc)* has a fixed lower frequency, for example, about 0.767 MHz. This second frequency is the same as the carrier frequency of the frequency-converted chrominance signal and is chosen to place the band of the frequency-converted chrominance signal below the band of the frequency-modulated luminance signal; and is also selected such that its second harmonic interleaves with the luminance signal.

The second frequency signal *Cb(fc)* is provided by means of a frequency divider 17 which receives the first frequency signal *Ca(fs)* from the oscillator 15 and divides *Ca(fs)* to one-fourteenth its frequency. This 1/14 *Ca(fs)* signal is applied to a frequency multiplier 18 which multiplies it by 3 to provide *Cb(fc)* whose frequency is three-fourteenths or 767,032 Hz referred to as 0.767 MHz. The frequency converter 16 receives the first *Ca(fs)* and second *Cb(fc)* signals produces a third frequency signal *Cd(fs +fc)* having a frequency which is their sum and, in the example being described, the sum of the frequencies *fs* and *fc* of the signals *Ca* and *Cb*. Thus, the resultant third frequency signal *Ca + Cb* has a frequency of approximately 4.35 MHz and is supplied to frequency converter 7.

The third frequency signal *Cd(fs +fc)* acts in frequency converter 7 to beat down the frequency band of the modulated chrominance signal *C(fs)* so that the frequency-converted chrominance signal *Cc(fc)* that issues from converter 7 will have a band width of about ±0.6 MHz with its center shifted to that of the second frequency about 0.767 MHz, that is, the difference between the subcarrier frequency (3.58 MHz) of chrominance signal *C(fs)* and the frequency of *fc+fs*. The frequency-converted chrominance signal *Cc(fc)* is supplied through a low-pass filter 8 and then to the add circuit or mixer, which is a signal synthesizer circuit 5.

The frequency-modulated luminance signal *Yfm* is also supplied to the signal synthesizer, or adder, circuit 5 which produces a combined signal (*Yfm* + *Cc*). The frequency band of the frequency-converted chrominance signal is below the lower limit of the frequency band of the frequency-modulated luminance signal *Yfm* as shown in FIG. 2. What is important to note is that the second harmonic of the center frequency of the frequency-converted chrominance signal is interleaved with the harmonics of the luminance signal.

The combined signal $Yfm + Cc$ thus produced in add circuit 5 is amplified by amplifier 9 and is recorded on a magnetic tape 11 by means of a magnetic head 10.

From the foregoing, the recording section of the system according to an embodiment of the present invention will be apparent. However, further description will be made of the relationship between the carrier frequency $fc$ of the frequency-converted chrominance signal and the horizontal synchronization frequency of the luminance signal. The carrier frequency is selected so as to satisfy the specific condition in which there is an interleaving relation between certain harmonics of said carrier frequency (i.e., those harmonics which cause interference) and the luminance signal.

The second harmonic has been discovered to be the cause of interference beats. This will be realized in the following discussion and with reference to FIG. 3. For ease of understanding, suppose that the carrier on which the luminance signal is frequency-modulated is modulated by only one frequency ($fy$) and the frequency-converted chrominance signal consists of also only frequency ($fc$) which is its carrier frequency, the luminance signal magnetically recorded on a magnetic tape includes beat signals occurring between the luminance signal ($fy$) and the chrominance signal ($fc$). The intensity-frequency distribution of the signals are shown as FIG. 3 and it is generally described as $fy \pm nfc$ where $n$ is 0 or positive integral number.

When the recorded signal having the foregoing spectrum is reproduced and frequency demodulated, the demodulated luminance signal includes the signals whose frequency are shown as $nfc$. More specifically, not only is the true luminance signal $y$ reproduced, but the carrier $fc$ and its harmonics signals $nfc$ of the frequency-converted chrominance signal $Cc$ are also reproduced and appear in the luminance signal. These chrominance signals in the reproduced luminance signal cause the beat interference in the reproduced picture.

Figure 3:
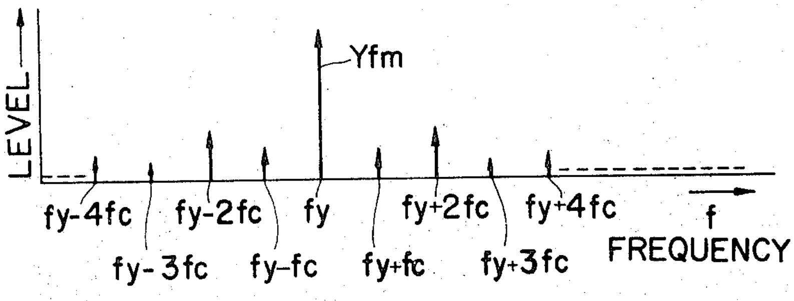
FIG. 3 is a diagram showing a frequency spectrum and illustrating the frequency relationship that may exist between the carrier frequency of the frequency-modulated luminance signal and the frequency-converted chrominance signal.

As a result of our research into such interference it was discovered that the signal corresponding to the second harmonic $2fc$ of the carrier frequency $fc$ of the frequency-converted chrominance signal, which is included in the reproduced luminance signal, has a relatively large level compared with the signals corresponding to the carrier frequency and its other harmonics. This is shown in FIG. 3. This second harmonic causes most of the deteriorations in the reproduced picture. All other signals are able to be substantially neglected in the interference. This fact is understood to occur because of ordinary magnetic characteristics of the recording systems. If the major source of beat interference can be removed, the amplitude of the whole frequency-converted chrominance signal may be increased, with the result that a strong chrominance signal may be reproduced with good signal-to-noise ratio.

The proposed solution to this problem is to arrange the carrier frequency fc of the frequency-converted chrominance signal such that its second harmonic is interleaved with the luminance signal.

Thus, the following expression can be established:

(1) $2fc = \frac{1}{2} fh\ (2m-1)$ $m$ = positive integral number 1,2, . . .

or (2) $fc = \frac{1}{4} fh\ (2m-1)$ in which: $fh$ = horizontal synchronizing signal frequency.

With such a relation, even if the interference frequency $2fc$ is included in the reproduced luminance signal, the interference in the reproduced picture does not actually appear in accordance with the frequency-interleaving principle.

This fact is the same as the frequency-interleaving method used for the usual NTSC color TV signal transmitting in order to avoid the interference caused by the chrominance signal included in the luminance signal, and therefore its effects are known.

In the NTSC system, the horizontal synchronizing frequency $fh$ and the carrier frequency $fs$ of the chrominance signal are selected as follows:

(3) $fh = 4.5\ 10^6/288\ \text{Hz} = 15.75\ \text{KHz}$ (4) $fs = \frac{1}{2} fh \times 455\ (\text{Hz}) \approx 3.58\ \text{MHz}$ $= \frac{1}{2} fh \times 13 \times 7 \times 5.$ One example of a selection of the converted carrier frequency $fc$ according to this invention would be to make $m$=98 in equation (2)

Figure 4:
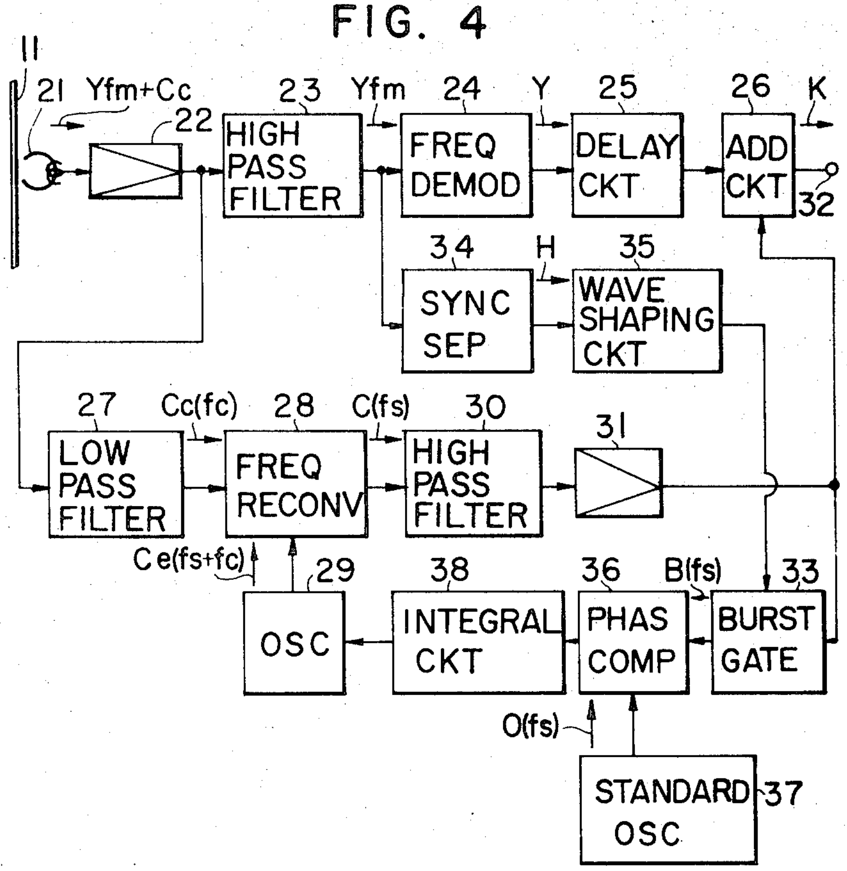
FIG. 4 is a schematic block diagram of a system to be used in reproducing signals recorded in accordance with the invention.

$fc = \frac{1}{4} fh \times 13 \times 5 \times 3$ $= fs \times 3/14$ $\approx 767 \times 10^3\ (\text{Hz})$ $= \frac{1}{4} fh\ (2 \times 98 - 1)$ $m = 98$ Referring now to FIG. 4, it will be seen that the combined signal $Yfm + Cc$ which has recorded on tape 11 may be reproduced by a magnetic head 21 disposed in contact with the tape. The combined signal thus reproduced is supplied to a playback amplifier 22, and thence through a high pass filter 23 to separate the carrier frequency-modulated by the luminance signal from the combined signal. Then signal $Yfm$ is supplied to a frequency demodulator 24 from which is obtained a reconstituted luminance signal Y, having a frequency band substantially similar to the original luminance signal. This luminance signal is in turn supplied to a delay circuit 25 and then to an add circuit 26. A part of the component signal $Yfm + Cc$ provided by the playback amplifier 22 is supplied to a low-pass filter 27 so that the frequency-converted chrominance signal $Cc(fc)$ such as shown in FIG. 2 is obtained therefrom and supplied to a frequency reconverter 28 which shifts or converts the carrier frequency from $fc$ (which in the example of the recorder was approximately 767 KHz) to its usual carrier frequency in the standard NTSC system of 3.58 MHz.

The frequency reconverter 28 receives a signal $Ce(fs + fc)$ from an oscillator 29 of the variable frequency type. The frequency of this signal is approximately 4.35 MHz and is composed of the 3.58 MHz signal and a 0.767 MHz signal. When this 4.35 Hz signal is mixed and beats with the frequency-converted chrominance signal, the band pass and center frequency of the chrominance signal is shifted to 3.58 MHz. The reconverted chrominance signal passes through a high-pass filter 30 and then to an amplifier 31.

The chrominance signal $C(fs)$ is supplied to a gate circuit 33 as gated signal, also the horizontal synchronizing signal $fh$ is extracted by a sync separator 34, and this $fh$ signal is also supplied to the gate circuit 33 as the control signal through a wave forming or shaping circuit 35.

The burst signal B($fs$) is extracted by the gate circuit 33, and this signal B($fs$) is supplied to a phase comparator circuit 36 as comparator signal.

An oscillator 37 generating the carrier frequency 0($fs$), is supplied to the comparator circuit 36 as a standard signal. The output signal of the comparator circuit is supplied to an integral circuit 38, so that the output of this circuit is DC voltage which depends on the change of the carrier frequency fs of the chrominance signal C($fs$) or its phase shift (due to variation in the tape speed), and this DC output is supplied to the oscillator 29 as a control signal. Accordingly, the carrier frequency signal fs of chrominance signal C($fs$) from converter 28 is synchronized with the generating frequency fs of the oscillator 37.

The chrominance signal C($fs$) from the amplifier 31 is also supplied to the add circuit or synthesizer type circuit 26 which combines its inputs of the luminance signal, and the chrominance signal to reconstitute the composite color video signal K which is provided at output terminal 32.

In the above described embodiment of the invention, the input signal to the recording and reproducing system has been assumed to be of the standard NTSC type in which the modulated chrominance signal is obtained by modulating with I and Q signals color subcarriers that are 90° out of phase with each other. However, it is apparent that the input to the system according to the invention is not limited to such NTSC type composite signal, but may be a color video signal of the so-called PAL type, in which the phases of the color subcarriers are line-sequentially inverted through 180°.

Further, although the above-described embodiment of the invention actually records and reproduces the combined signal $Yfm + CC(fc)$ by means of particular magnetic recording and reproducing devices, that is, magnetic heads 10 and 21 engageable with tape 11, it is to be understood that such combined signal ($Yfm + Cc(fca)$ may be recorded and reproduced by any other magnetic devices adopted therefor.

Having described a particular embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A system for recording a composite color video signal that includes a horizontal synchronizing signal having a frequency fh, a luminance signal, and a chrominance signal modulated on a chrominance carrier, said system comprising:
 means for extracting said luminance signal and chrominance signal separately from said composite signal,
 means for frequency-modulating a second carrier signal with said luminance signal,
 means for frequency-converting the chrominance signal and chrominance carrier to a lower frequency band than that of said frequency-modulated second carrier signal with an interleaving relation between the second harmonic of the converted carrier frequency $fc$ of the chrominance signal and the luminance signal, wherein $$fc = \frac{1}{4} fh(2m-1)$$

and $m$ is any positive integer,
 means for forming a combined signal from said frequency-converted chrominance signal and said frequency-modulated second carrier signal, and
 means for magnetically recording said combined signal.

2. A system according to claim 1, in which said means for frequency-converting the chrominance signal comprises:
 means for generating a local signal having a selected frequency which is a specific non-integral sub-multiple of the carrier frequency of said chrominance signal, and
 means for combining said chrominance signal and chrominance carrier with said local signal for frequency-converting the chrominance signal and chrominance carrier to establish said interleaving relation.

3. A system according to claim 1, in which said means for frequency-converting the chrominance signal comprises:
 means for extracting a burst signal from the chrominance signal,
 means for generating a continuous signal having the same frequency as the carrier signal of the chrominance signal under control of said burst signal,
 means for forming a frequency-converting signal having a specific lower frequency than said continuous signal and controlled by said continuous signal, and
 means for combining said frequency-converting signal and said chrominance signal to shift said chrominance signal to said lower frequency band so as to establish said interleaving relation.

4. A system for recording and reproducing a composite color video signal that includes a horizontal synchronizing signal having a frequency fh, a luminance signal, and a chrominance signal modulated on a chrominance carrier, said system comprising:
 means for frequency-modulating a second carrier signal by said luminance signal,
 means for frequency-converting the chrominance signal and chrominance carrier to a lower frequency band than that of said frequency-modulated second carrier signal, and with an interleaving relation between the luminance signal and the second harmonic of the carrier frequency $fc$ of the frequency-converted chrominance signal, wherein $$fc = \frac{1}{4} fh (2m-1),$$

and $m$ is a positive integer,
 means for combining said frequency-modulated carrier signal with said frequency-converted chrominance signal,
 means for magnetically recording said combined signal and for magnetically reproducing the same,
 means for extracting said frequency-modulated carrier signal and frequency-converted chrominance signal from the reproduced combined signal,
 means for demodulating the frequency-modulated carrier to reproduce the luminance signal, and
 means for reconverting the chrominance signal to its original frequency band.

* * * * *